United States Patent [19]

Slade

[11] 4,067,540
[45] Jan. 10, 1978

[54] SEGMENTED PLUG VALVE

[76] Inventor: Edward C. Slade, 6791 S. Race, Littleton, Colo. 80122

[21] Appl. No.: 674,569

[22] Filed: Apr. 7, 1976

[51] Int. Cl.² .......................................... F16K 31/163
[52] U.S. Cl. ................................. 251/63.4; 251/212
[58] Field of Search .................... 251/1 R, 63.4, 212

[56] References Cited

U.S. PATENT DOCUMENTS

| 2,025,665 | 12/1935 | Dickinson | 251/1 R |
|-----------|---------|-----------|---------|
| 2,911,997 | 11/1959 | Schramm et al. | 251/212 |
| 2,955,798 | 10/1960 | Sights | 251/212 |
| 2,956,582 | 10/1960 | Pranter | 251/212 |
| 3,084,898 | 4/1963 | Miller | 251/212 |
| 3,887,158 | 6/1975 | Polk | 251/212 |

Primary Examiner—Martin P. Schwadron
Assistant Examiner—G. L. Walton
Attorney, Agent, or Firm—Edwin L. Spangler, Jr.

[57] ABSTRACT

This invention relates to a valve characterized by a hollow cylindrical body, the interior of which houses a segmented conical plug for axial movement with its apex pointed upstream. A frustoconical seat inside the hollow body also faces upstream and cooperates with similarly shaped surfaces at the base of each plug segment to cam the latter into cone-forming relation upon axial movement thereof in a downstream direction. In closed position these opposed frustoconical surfaces mate to define a continuous annular fluid tight seal. Downstream of the segmented plug subassembly is an externally ribbed tubular slide mounted for limited reciprocating movement in an axial direction back and forth between the axially spaced endwalls of an inwardly opening annular groove. Externally operated means are provided which, upon actuation, shift the slide between its extended upstream position and its retracted downstream one by exerting a suitable axially directed force against the appropriate face of the rib. Leaf springs normally biasing the segments of the cone subassembly into open position connect the latter to the adjacent upstream end of the slide. Actuation of the slide into extended position opens the valve while retraction of the slide closes same. The segments of the plug cooperate in closed position to define a fluid-tight seal and at least one of the mating surfaces is covered, coated or otherwise treated so as to effect such a seal, the same thing being true of the mating surfaces between the plug and seat therefor.

14 Claims, 6 Drawing Figures

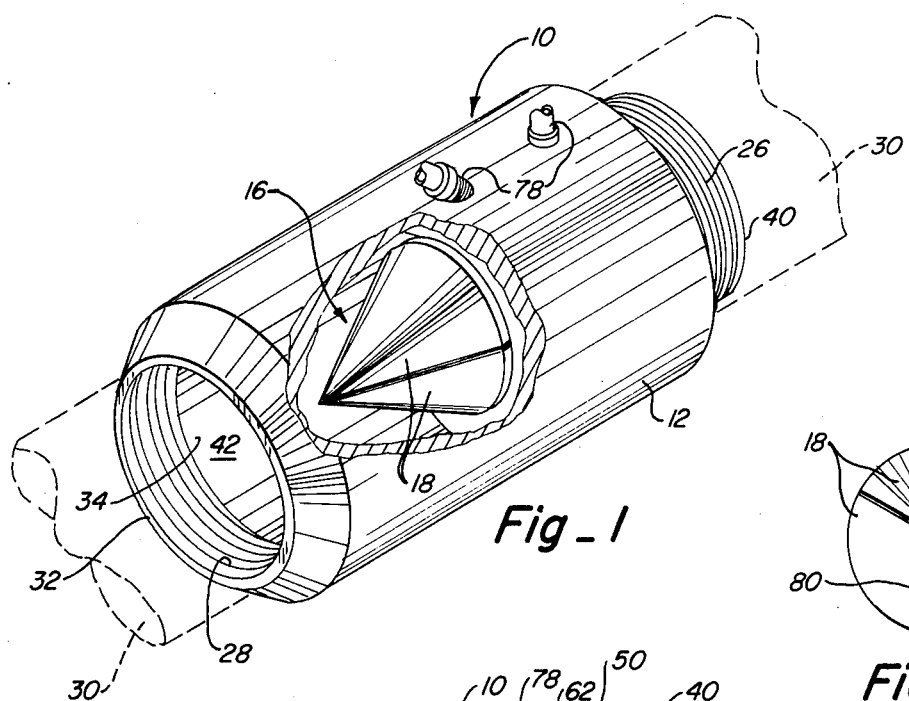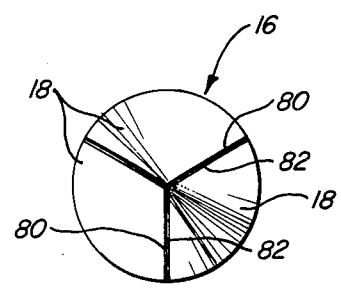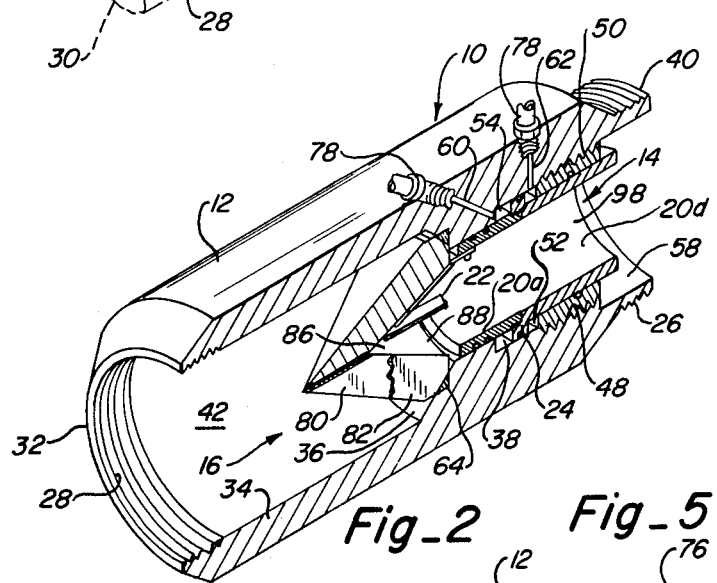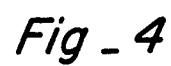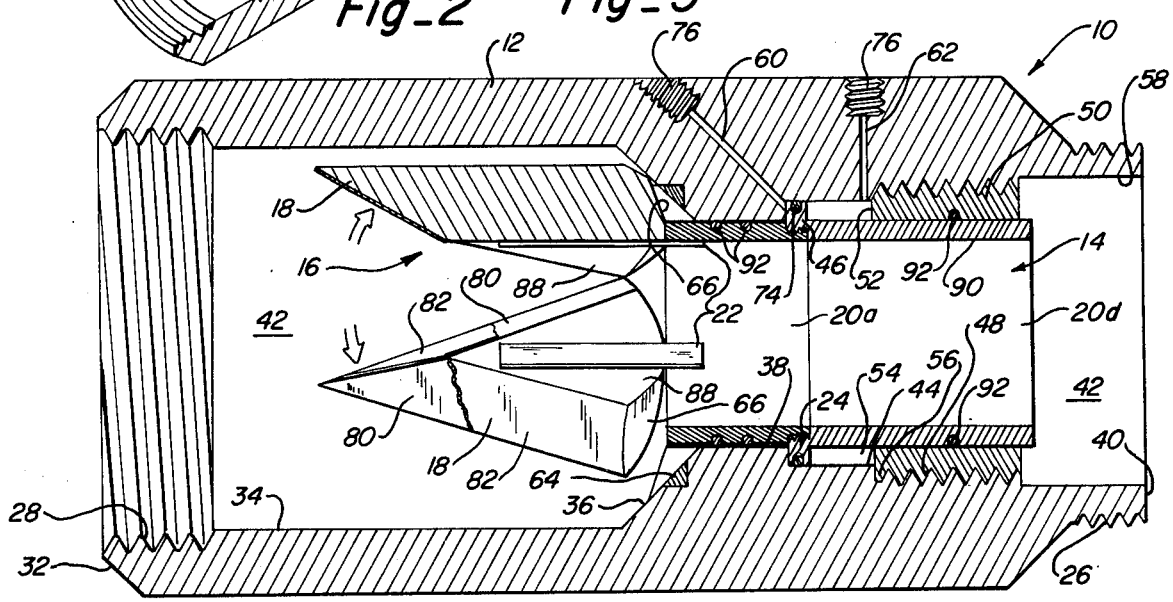

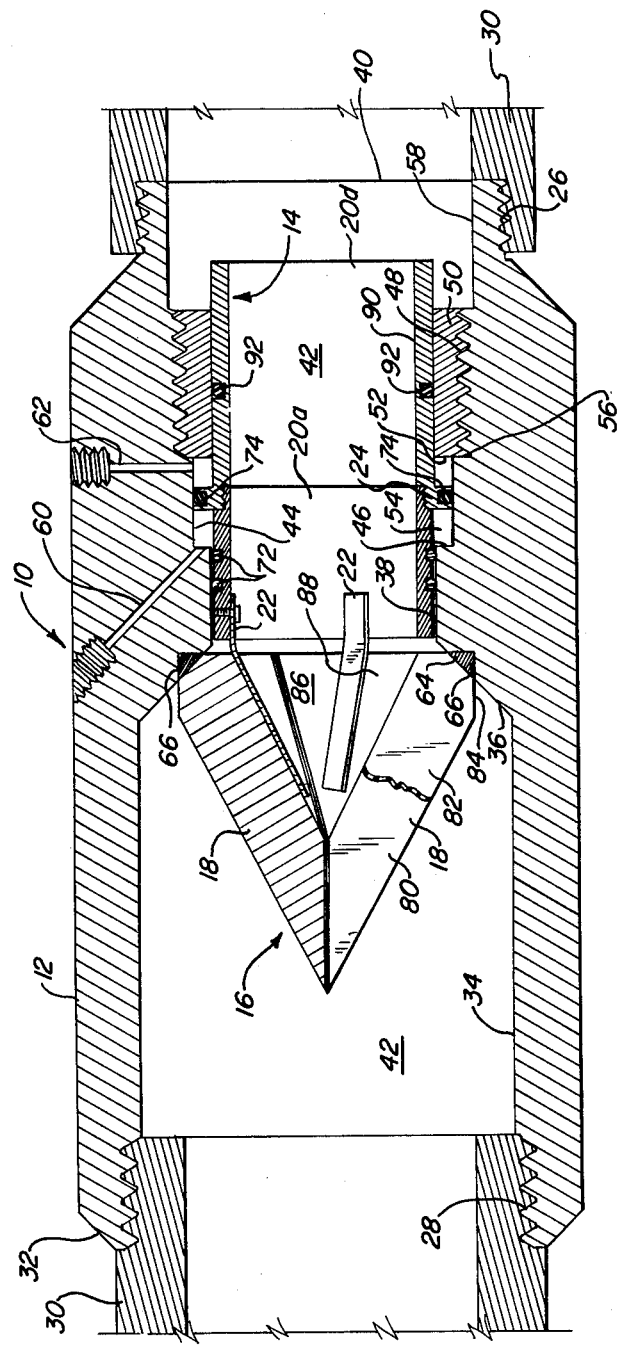

SEGMENTED PLUG VALVE

Valves based upon the principle of a plug member having two or more segments which open and close in jaw-like fashion to control the flow of a liquid or gaseous medium through a pipe are old and well known. Examples of such valves are those forming the subject matter of the U.S. patents to Pranter U.S. Pat. No. 2,956,582; Miller U.S. Pat. No. 3,084,898; Schramm et al. U.S. Pat. No. 2,811,987; and, Burchett U.S. Pat. No. 2,406,662; all of which employ some type of jaw-like plug that opens to pass whatever is flowing in the pipe. A clamshell valve element like that of Pranter hinge about a transverse axis and provide for no axial movement. Also, springs are employed to close Pranter's jaws rather than applicant's frustoconical seat that defines a cam surface operative upon downstream axial movement of the plug to cooperate with complementary surfaces carried by its segments to effect closure thereof. In Miller's "Fluid Actuated Valve," his segmented plug is not spring biased into open position and, most significantly, it faces in the direction opposite to that of applicant's. The Schramm et al. valve opens instead of closes upon retractable movement and, as was true of the previously-mentioned prior art valves, it does not avail itself of the fluid pressure acting against its segmented plug to seat and effect a closure thereof. Burchett's valve is a clamshell valve much like that of Pranter's, especially with respect to the fact that it does not move axially downstream into a closed position against a seat.

While all of the aforementioned prior art segmented plug and clam shell valves that control fluid flow with a jaw-like action have their advantages and disadvantages, few, if any, of them are capable of functioning satisfactorily in applications such as shutting off the flow of radioactive materials where a maximum leak rate of somewhere around 2 curb centimeters of free nitrogen is all that can be tolerated. This is especially true in view of the body designs, all of which, without exception, involve two or more sections that are exceedingly difficult to seal so as to prevent leakage. More conventional valve designs such as those having stems, packing glands, handwheels and other external appurtenances are even less well suited to the handling of radioactive materials because of the extreme danger of contamination.

It has now been found in accordance with the teaching of the instant invention that these and other deficiencies inherent in the design of the prior art valves including those using a segmented plug can, in large measure, be eliminated by the simple, yet unobvious, expedient of providing the downstream end of each conical segment with a frustoconical surface that coacts upon downstream axial movement of the plug with an upstream-facing frustoconical seat to cam the segments into closed position. The pressure of the flowing fluid exerted upon the conical surfaces of the plug segments assists the valve-actuating mechanism to overcome the bias exerted on the plug segments by the valve-opening springs when the valve is being closed. Moreover, once closed, this same fluid pressure performs the dual function of holding the segments in fluid-tight sealed engagement with one another while, at the same time, keeping the plug of which they form a part seated in fluid-tight sealed contact with its seat. The novel valve body comprises a unitary hollow cylindrical shell having no external appurtenances whatsoever that must be moved, and therefore sealed, in order to actuate same. In the case of hydraulic or pneumatically actuated versions of the valve, the threaded fittings which screw into the walls of the valve body are no more difficult to seal than the threaded connections at the ends thereof that are used to fasten it into the pipeline or other conduit. Electrically operated versions, especially those in which the plug is shifted axially through some electromagnetic coupling, are even simpler to render leak tight.

Assembly of the plug and actuating mechanism therefor is all accomplished through the open ends of the body. Once assembled, these elements are retained in place for limited axial movement by an externally threaded sleeve that screws into the body and cooperates with a previously formed shoulder therein to define an inwardly opening annular groove within the confines of which the external rib on the slide subassembly moves to and fro.

Secondary and tertiary O-ring seals back up the annular seal formed between the mating frustoconical surfaces of the plug segments and seat to prevent the escape of the contents of the pipeline into the actuating mechanism. The downstream-facing shoulder on the upstream end of the annular groove defines an annular stop effective to limit the upstream excursion of the plug and associated elements when moving into open position. Conversely, the upstream-facing shoulder on the downstream end of the groove lies spaced downstream of the annular rib in all axial positions of the plug so as to permit the latter to seat freely.

The pressure of the fluid in the pipeline acting against the conical surface of the plug when the segments of the latter are closed greatly magnifies the seating forces. On the other hand, when the instant the plug is unseated and its segments open under the bias exerted thereon by the springs, the forces tending to maintain the segments closed and the plug seated return to near normal levels.

It is, therefore, the principal object of the present invention to provide a novel and improved in-line valve having an axially movable segmented plug.

A second object is the provision of a device of the character described which seats by downstream axial movement aided by the pressure of the medium flowing in the pipeline acting thereagainst.

Another objective is the provision of a valve having a one piece outer body containing no externally located moving parts thus eliminating the need for packing glands and the like.

Still another object is to provide a valve design which is ideally suited for use in handling radioactive materials.

An additional object is the provision of a valve of the type aforementioned which is moved between its open and closed positions by a simple axial shift of the plug subassembly and, as such, is ideally suited to be adapted for actuation by many different systems including pneumatic, hydraulic, electrical and electromagnetic.

Further objects are to provide a segmented conical plug valve which is simple, inexpensive, trouble-free, one that is compact yet provides for unobstructed flow when open, and a unit of the type aforementioned that is easily modified for use in various and sundry applications ranging from the ordinary to the highly specialized.

Other objects will be in part apparent and in part pointed out specifically hereinafter in connection with the description of the drawings that follows, and in which:

FIG. 1 is a perspective view, portions of which have been broken away to expose the interior construction, showing the valve of the present invention connected into a pipeline, the latter having been revealed in phantom lines;

FIG. 2 is a perspective view to the same scale as FIG. 1 but showing the valve in diametrical section;

FIG. 3 is a perspective view to the same scale as FIGS. 1 and 2 showing the segmented plug by itself;

FIG. 4 is a front elevation of the plug alone;

FIG. 5 is a diametrical section of the complete valve to an enlarged scale and showing it in open position; and, FIG. 6 is a diametrical section similar to FIG. 5 and to the same scale but differing therefrom in that it shows the valve in closed position.

Referring next to the drawings for a detailed description of the present invention and, initially, to FIGS. 1, 2, 5 and 6 for this purpose, reference numeral 10 has been employed to represent the valve broadly while numeral 12 refers to the body thereof and numeral 14 to the plug subassembly as a whole. The plug subassembly is further subdivided into a conical plug that has been indicated in a general way by numeral 16 and which includes three 120° segments 18 in the particular form shown along with other features that will be described in greater detail presently; a two-part tubular slide 20; leaf springs 22 interconnecting the slide and plug segments normally biasing the latter into open position; and an external annular rib 24 encircling the slide intermediate the ends thereof.

The body 12 in the form illustrated is a hollow cylinder having a male threaded section 26 on one end and a female 28 on the other for connecting same into a pipeline 30 (FIG. 6). The upstream end 32 of the body contains an axial bore 34 terminating in a frustoconical seat 36 located intermediate the ends thereof and facing upstream. An axial counterbore 38 enters from the downstream end 40 and opens into bore 34 cooperating therewith to define a flow passage 42 therethrough.

Counterbore 38 is stepped to define several sections located one behind the other, each being somewhat larger than the one ahead of it. The innermost enlarged section 44 is separated from the main counterbore 38 by a downstream-facing shoulder 46 which defines an abutment effective to limit the upstream excursion of the plug subassembly 14 when annular rib 24 engages same. Adjacent the innermost enlargement 44 and downstream thereof is located an internally threaded enlargement 48 into which is screwed an externally threaded sleeve 50, the inside diameter of which is approximately the same as the main counterbore 38 so as to produce an upstream-facing shoulder 52 at the upstream end thereof. Shoulders 46 and 52 cooperate with one another and with the innermost enlargement 44 to produce an annular groove 54 within which rib 24 moves axially to and fro as the plug subassembly reciprocates between its open and closed positions. Separating enlarged sections 44 and 48 is a downstream-facing shoulder 56 against which the sleeve 50 comes to rest.

In the particular form shown, still another smooth-surfaced enlargement 58 of the counterbore 38 is provided adjacent the downstream end 40 of the body 12. The latter or "outermost enlargement" has no function other than to be of sufficient diameter to freely pass sleeve 50. If desired, threaded enlargement 48 could be extended all the way to the downstream end of the body thereby eliminating the outermost enlargement 58 altogether.

A passage 60 opening onto the surface of the body opens into the upstream end of annular groove 54 through downstream-facing shoulder 46. A second passage 62 connects the exterior of the body into the downstream end of annular groove 54 behind annular rib 24 even when the plug subassembly is in its extreme downstream axial position shown in FIG. 6 that corresponds to the closed position of the valve as will be explained presently.

About the only other feature worthy of specific mention insofar as the body 12 is concerned is the gasket 64 which is inset into the frustoconical seat 36 in position to engage and form a continuous annular leak-tight seal around the base of the conical plug 16 where the mating frustoconical surfaces 66 of the cone segments 18 are located. This gasket may be fabricated from any one of a number of conventional gasket-forming materials of a type well known in the art including even malleable metals and alloys thereof, particularly gold.

The details of construction of the plug subassembly 14 will be set forth in detail next for which purpose reference will be made to all six figures of the drawings each of which shows portion thereof. The slide 20 is tubular and consists of two sections, an upstream section 20u and a downstream section 20d. The upstream section has a threaded portion 70 on its downstream end onto which is screwed the annular rib 24 in the particular version illustrated. As shown, the downstream section is attached in axial relation to the downstream end of the upstream section after the rib is in place on the latter.

Slide 20 is mounted in counterbore 38 and sleeve 50 to provide a sliding fit. O-ring seals 72 are provided between the upstream section 20u of the slide and the wall of the counterbore. Two such seals have been shown, both of which cooperate with the plug 16 when seated to define secondary and tertiary seals effective to hold the fluid pressure upstream. In high pressure systems, additional seals may be required such as, for example, between the downstream section 20d of the slide and sleeve 50. As illustrated, an O-ring seal has been provided between rib 24 and groove 44 although, obviously, maintaining the pressure of the actuating system at a level higher than that of the system will effectively prevent loss of the medium in the pipeline out through passages 60 and 62. The advantage of a fluid-tight seal between rib 24 and the wall of the groove in which it rides is, of course, that no contamination of one fluid by the other can occur in either direction. Rib 24 can, obviously, be replaced by a conventional piston ring of the type used in an internal combustion engine as an alternative construction of a type which would be readily apparent to one skilled in the art.

The entryways 76 to ports 60 and 62 are threaded to accept standard pressure fittings 78 by means of which air or some other actuating fluid effective to shift the plug subassembly between its open and its closed positions can be introduced. While the valve as illustrated is designed for either pneumatic or hydraulic actuation, it is by no means restricted to either of these methods of shifting the plug subassembly axially to and fro; in fact, for many applications an electromagnetic actuation system of one type or another should, and probably would, be used in place of the one shown. While a mechanical actuation system could be used, it has the disadvantage of requiring the usual packing glands and the like that are difficult to seal; whereas, the instant valve is ideally suited to the pneumatic, hydraulic and electrical actuation systems, all of which avoid most of the problems of the mechanical approaches.

The conical plug 16 is the key element in the valve and, as previously noted, it is made in two or more, preferably three, segments 18. These segments cooperate with one another in the closed position shown in all but FIG. 5 to define a right conical surface facing upstream in coaxial relation to the bore 34. In the particular form shown, the mating surfaces 80 of each segment are planar and oriented in radial relation to the cones axis when the segments are closed. At least one of each pair of mating surfaces 80 is overlayed by a thin layer of suitable gasket-forming material effective to produce a leak-tight seal when the segments of the plug are closed. It may, of course, be necessary to machine the mating faces to which the gasket is affixed in order to accommodate the latter. As illustrated, both mating surfaces are overlayed with a gasket.

The plug is shown provided with a short cylindrical section 84 at the base thereof separating the conical surfaces from the frustoconical ones 66 that engage the seat 36 and its gasket 64. Frustoconical surfaces 36 and 66 also cooperate with one another when the plug subassembly 16 is shifted axially in a downstream direction to cam the leaves or segments 18 of the plug closed against the bias exerted thereon by the leaf springs 22. Once closed, of course, the fluid pressure exerted against the substantial area of the conical surface of the plug serves to press its segments tightly together and maintain them in fluid-tight sealed engagement with one another. The conical surface is tilted at an angle of about 30° the direction of flow; however, this is not critical. A greater surface area is, obviously, provided with a shallower angle of taper thus greatly increasing the total pressure available to keep it closed. The trade-off is, of course, a much longer plug with correspondingly larger mating surfaces between the plug segments that must be sealed. While the frustoconical surfaces 36 and 66 have been shown tapered at an angle of about 45° to the direction of flow, here again, this angle is not critical and can be substantially increased or decreased probably as much as 15° in either direction without seriously effecting operation of the valve. From an overall standpoint, the taper of the upstream-facing conical surface is of greater significance than that of the frustoconical seating surfaces, especially when the taper of the conical surface becomes too steep. Not only does this result in a sacrifice of conical surface area, the springs 22 must deflect to a far greater degree while opening the segments of the plug. Accordingly, the 30° taper shown constitutes a good compromise and should not be exceeded by more than a few degrees for good results.

A conical depression or well 86 is produced in the downstream end of the plug when the segments 18 of the latter are closed. This well is a right conical one and preferably dimensioned such that when the outside conical surfaces of the plug segments lie in parallelism with the bore 34 as shown in FIG. 5, the inside conical surfaces 88 will define continuations of the inner cylindrical surfaces 90 of the slide 20.

Leaf springs 22 are of conventional construction and they provide the physical connection between the segments as well as the bias exerted upon the latter that actuates them into open position once the plug subassembly is shifted axially upstream.

As the plug subassembly of the present invention is shifted upstream into the position shown in FIG. 5 by impressing a fluid pressure on the downstream-facing side of rib 24 through passage 62, the segments 18 will be released into open position under the influence of springs 27. Upstream excursion of the subassembly 16 is, of course, limited by the downstream-facing wall 46 of groove 54 which acts as a stop. Passage 66 must open as shown through this wall 46, otherwise, there would be no exit for the actuating fluid to escape through and the valve could not be fully opened.

When moving from open to the closed position of FIGS. 1, 2 and 6, on the other hand, the upstream-facing wall 52 of groove 54 lies spaced downstream of the opposed surface of rib 24 in all axial positions of the plug subassembly so as to permit the latter to seat securely. An O-ring seal 92 is preferably located between the downstream section 20d of the slide and sleeve 50 to hold any system pressure above ambient while the passages 60 or 62 are open to the atmosphere. Also, this O-ring 92 along with O-rings 72 on the upstream side of groove 54 function to prevent the valve-actuating fluid from contaminating the fluid flowing in the pipeline.

What is claimed is:

1. The segmented plug type valve which comprises: a body having a flow passage therethrough one end of which opens upstream while the other end opens downstream, an upstream-facing continuous annular right frustoconical seat positioned intermediate the ends of said passage, and a cylindrical section within said passage located downstream of said seat in coaxial relation thereto; a tubular slide mounted within the cylindrical section of said flow passage for axial movement; a segmented plug located within the flow passage upstream of the seat, said plug including two or more jaw-like segments having mating surfaces cooperating with one another in closed position to define a right conical surface facing upstream in coaxial relation to said seat, a pocket formed in the downstream end of the plug shaped to define a continuation of said flow passage when the segments of said plug are in open position, and downstream-facing right frustoconical surfaces on the downstream end of each plug segment operative to engage said seat upon downstream axial movement of the plug thereagainst and cam said plug segments into closed cone-forming relation; means comprising leaf springs independently connecting each plug segment to the slide for conjoint movement in an axial direction, said springs being operative to normally bias the segments associated therewith into open position upon axial movement of the plug upstream away from the seat; first gasket means interposed between the seat and frustoconical surfaces of the plug segments effective to produce a continuous annular fluid tight seal with said plug segments in closed cone-forming relation; second gasket means interposed between the mating faces of said plug segments effective in the closed cone-forming position of the latter to form a fluid-tight seal therebetween; and, externally accessible means connected to the slide operative upon actuation to shift the latter axially both upstream and downstream.

2. The segmented plug type valve as set forth in claim 1 in which: the body includes an annular groove within the cylindrical section spaced downstream of the seat in position to open inwardly onto the slide, said groove having a cylindrical wall bounded at both ends by opposed annular shoulders and a pair of passages opening onto the exterior of the body communicating the interior of said groove at opposite ends thereof; an annular rib encircling the slide in fluid-tight sliding engagement with the cylindrical wall of the groove; and in which said slide-actuating means comprises a source of fluid under pressure connectable to deliver same to the groove through one passage and exhaust it through the other.

3. The segmented plug type valve as set forth in claim 2 in which: the annular shoulder on the downstream end of the groove is defined by the upstream end of a sleeve introduced into the downstream end of the flow passage.

4. The segmented plug type valve as set forth in claim 2 in which: an annular fluid-tight seal is interposed between the slide and cylindrical section of the flow passage upstream of the annular groove.

5. The segmented plug type valve as set forth in claim 2 in which: an annular fluid-tight seal is interposed between the slide and cylindrical section of the flow passage downstream of the annular groove.

6. The segmented plug type valve as set forth in claim 2 in which: an annular fluid-tight seal is interposed between the annular rib and the cylindrical wall of the groove.

7. The segmented plug type valve as set forth in claim 1 in which: the first gasket means is carried by the seat.

8. The segmented plug type valve as set forth in claim 1 in which: the second gasket means comprise resilient compressible elements carried by both of the opposed mating surfaces of adjacent plug segments.

9. The segmented plug type valve as set forth in claim 1 in which: the plug is divided into three substantially identical segments having sidewalls comprising radially-extending planar surfaces angularly spaced from one another approximately 120°.

10. The segmented plug type valve as set forth in claim 1 in which: the pocket in the downstream end of the plug is conical.

11. The segmented plug type valve as set forth in claim 1 in which: the body includes a one piece outer shell.

12. The segmented plug type valve as set forth in claim 1 in which: the seat is inclined at an angle of approximately 45° to the axis of its conical surface.

13. The segmented plug type valve as set forth in claim 1 in which: the conical surface of the plug is inclined at an angle of approximately 30° to its axis.

14. The segmented plug type valve as set forth in claim 1 in which: the portion of flow passage upstream of the seat is larger than the cylindrical section thereof by an amount not less than approximately the thickness of the plug segments so as to receive the latter in open position without obstructing the flow.

* * * * *